United States Patent

[11] 3,582,209

[72] Inventors Charles N. La Rosa
 New Hyde Park, N.Y.;
 Manfred J. Prager, Elizabeth, N.J.; Joseph
 L. Kalinsky, Valley Stream, N.Y.
[21] Appl. No. 775,838
[22] Filed Nov. 14, 1968
[45] Patented June 1, 1971
[73] Assignee The United States of America as
 represented by the Secretary of the Navy

[54] DETECTION OF TOXIC ORGANOPHOSPHORU
 AIRBORNE SUBSTANCES BY FRUSTRATED
 MULTIPLE INTERNAL REFLECTION
 SPECTROSCOPY
 1 Claim, 7 Drawing Figs.
[52] U.S. Cl.................................................. 356/51,
 250/83.3H, 356/74, 356/244
[51] Int. Cl......................................................G01n 21/34
[50] Field of Search........................................... 356/74, 51,
 244, 246; 250/83.3 IR

[56] References Cited
 UNITED STATES PATENTS
 3,515,490 6/1970 Dreyfus et al................. 356/244

OTHER REFERENCES

"Applied Spectroscopy", Volume 21, No. 1, January/February, 1968, pages 48 and 49 relied on
La Rosa et al. Page 92 of the detailed program of The Pittsburgh Conference on Analytical Chemistry and Applied Spectroscopy, March 6— 10, 1967, Handout
Prager et al., "Applied Spectroscopy", Volume 2, No. 5 September/October 1968, Pages 449— 451

Primary Examiner—Ronald L. Wilbert
Assistant Examiner—F. L. Evans
Attorneys—Louis A. Miller, Louis B. Applebaum and Arthur L. Bowers ABSTRACT: A thin germanium crystal prism in the form of an isosceles trapezoid or parallelogram whose base surface and opposite parallel surface are coated with platinum about 70 millimicrons thick, the coating having been applied in a vacuum on the order of 10 millimicrons for effective adsorptiveness. Sampled atmosphere is flowed across the base and the opposed surface of the crystal while infrared of wavelength band 9—10 microns is directed through the crystal for multiple internal reflection and the amplitude of infrared that passes through the crystal is monitored.

INVENTORS.
CHARLES N. LA ROSA
MANFRED J. PRAGER
JOSEPH L. KALINSKY

INVENTORS.
CHARLES N. LA ROSA
MANFRED J. PRAGER
JOSEPH L. KALINSKY

DETECTION OF TOXIC ORGANOPHOSPHORU AIRBORNE SUBSTANCES BY FRUSTRATED MULTIPLE INTERNAL REFLECTION SPECTROSCOPY

The invention described herein may be manufactured and used by or for the Government of the United States of America for governmental purposes without the payment of any royalties thereon or therefor.

The atmosphere is monitored for contamination by a variety of suspected toxic substances. For example, concentration of sulfur dioxide emitted by the stacks of fossil fuel power plants is now monitored routinely. Similarly, the atmosphere is monitored for toxic organophosphorus compounds that may be spewed into the atmosphere primarily as insecticides. Error, poor judgment, unanticipated change in weather, even antisocial intent, can lead to hazardous concentration of such substances in the atmosphere in local areas. Insecticidal phosphorus compounds are similar in chemical structure to the nerve gases e.g. phosgene though not nearly as toxic.

Spectroscopic methods for examining samples of materials for traces of toxic organophosphorus substances are known but the methods are cumbersome, are limited to isolated checks as opposed to continuous monitoring and require trained laboratory personnel. These prior methods cannot provide essentially instantaneous warning of a hazardous situation.

An object of this invention is to continuously monitor the atmosphere to detect the presence of trace quantities of selected substances particularly toxic organophosphorus substances.

Other objects, advantages and novel features of the invention will become apparent from the following detailed description of the invention when considered in conjunction with the accompanying drawings wherein:

FIGS. 1—3 illustrate an optical phenomenon utilized in this invention;

Figure 1:
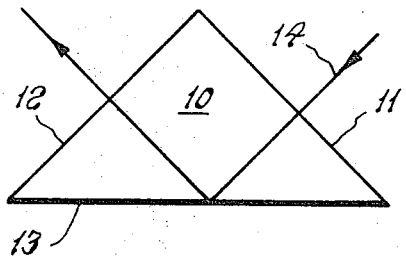

FIG. 1 shows a germanium crystal in the form of an isosceles triangular prism 10 having mirror smooth polished slant faces 11, 12 and base 13. A beam 14 of energy in the infrared band directed to the slant face 11 at 90° is transmitted linearly to the base 13. If the angle of incidence to the base is greater than the critical angle, substantially all the energy incident to the prism exits from slant face 12. However, if the base surface is smeared as in FIG. 2 with an adherent matrix material 15 which makes intimate contact with the base surface and which contains a dispersed trace of a substance that absorbs energy within that infrared band, an incident beam 14 of infrared energy is attenuated at particular wavelengths compared to beam 14 of infrared energy incident to the prism 10 as in FIG. 1 without a smear on its base whereby the presence of a suspect contaminant is detected. Presumably the infrared beam penetrates the smear in reflection toward the other slant face and loses energy on interacting with the trace of contaminant that absorbs energy within the band of infrared beam 14. Because the infrared beam 14 cannot see the contaminant substance in the atmosphere directly when the prism is exposed to that atmosphere, a trace of airborne suspect substance is captured in the matrix material by any conventional techniques such as forcing a quantity of air through a filter or bubbling a quantity of atmosphere through a wash liquid and transferring some of the trapped substance to the matrix material 15.

The technique of coating the prism base with a matrix containing a substance to be studied is utilized in spectrophotometry and serves as a valuable tool for the analytical chemist to supplement transmission absorption techniques. The band of incident energy beam 14 is essentially flat. Intensity $v$ wavelength of the energy that exits from the prism is plotted by the spectrophotometer.

Figure 2:
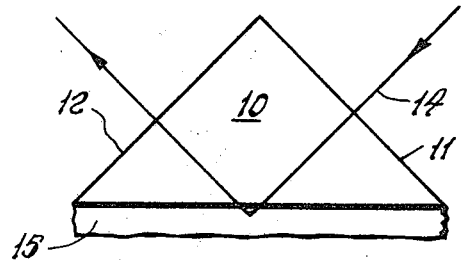
Figure 3:
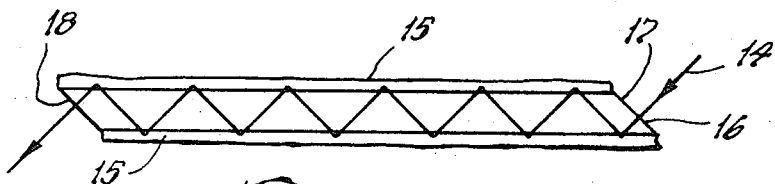

The effectiveness of the phenomenon shown in FIG. 2 is enhanced by multiple internal reflections as illustrated in FIG. 3. A thin crystal 16, with parallel sides 17 and 18 at 45° to the base carries coating 15 on its base and on the parallel surface. Attenuation of infrared energy 14 at the characteristic absorption frequency or frequencies of the contaminant substance in coating 15 is repeated at each reflection.

Figure 4:
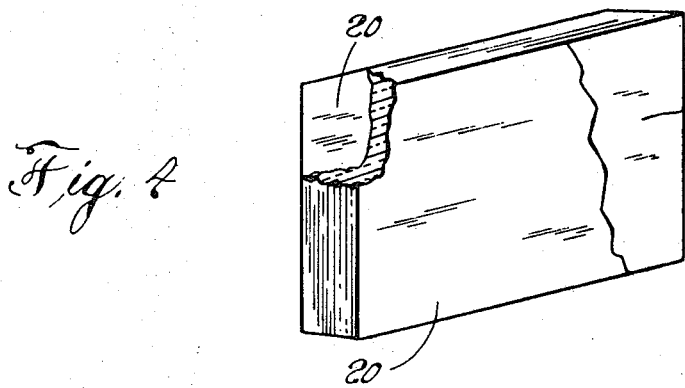
FIG. 4 is a perspective view of a coated multiple internal reflection cell, in accordance with this invention.
Figure 5:
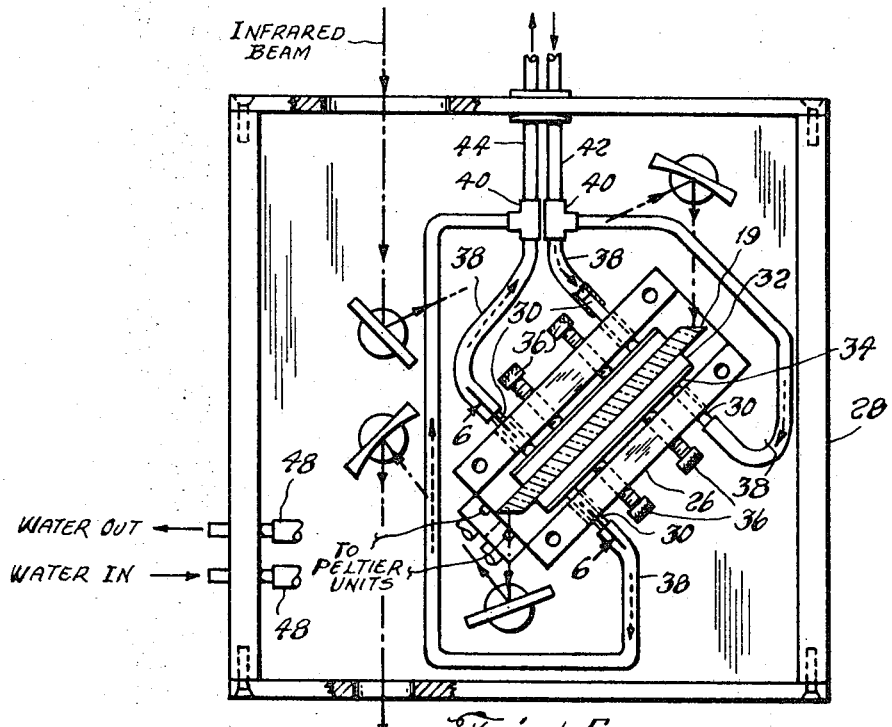
FIG. 5 is an atmosphere monitoring apparatus mounting a cell as in FIG. 4 but having parallel sides and FIG. 6 is a section taken on line 6—6 of FIG. 5 on a larger scale.
Figure 6:
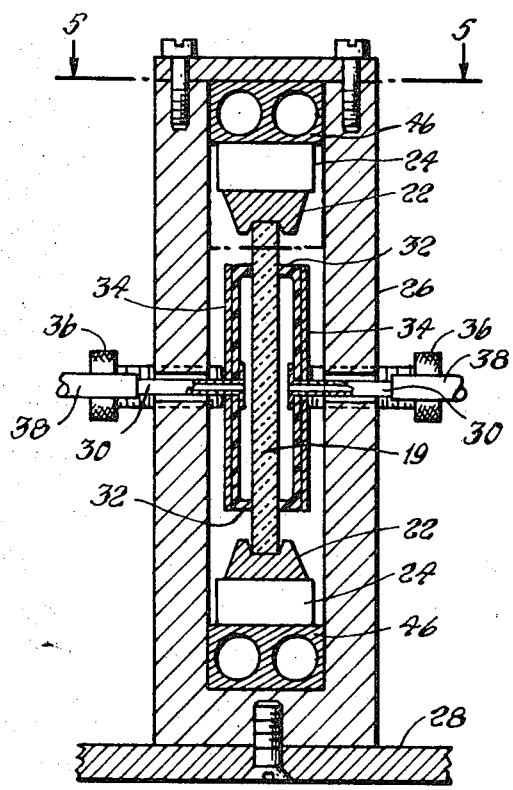

In this invention, a crystal 19, as shown in FIG. 4 preferably germanium, is coated on its base and on the opposite parallel face with a film 20 of platinum on the order of 70 millimicrons thick applied by vacuum deposition in a vacuum of about 10 millimicrons. In FIGS. 5 and 6, the crystal 19 is seated in a pair of opposed holders 22 between temperature control means 24 and is located within a black-surfaced nonreflective rectangular frame 26 supported in a housing 28. The sidewalls of the frame 26 are formed with two holes each, through which extend loosely fitted short lengths of rigid tubing 30. A pneumatic channel element 32 is penetrated and carried by and sealed to each pair of short lengths of tubing 30 that extend through one sidewall of frame 26. Each channel element 32 is an elongate, comparatively yieldable recessed plastic member backed by a rigid plate 34. Clamping screws 36 are threaded into the sidewall of the frame for engaging the backing plates and forcing the pneumatic channel elements against opposite faces of the crystal 19 mounted in the holders. Flexible tubing 38 is attached to the free end of each of the short rigid tubings 30. Flexible tubings 38 extending from corresponding ends of the two pneumatic channel elements are joined by tees 40. A fan or pump not shown for continuously drawing a sample of atmosphere delivers the sampled atmosphere through tubing 42 to one tubing pair for flowing atmosphere sampling across the opposite faces of the crystal 19. The sampled atmosphere is exhausted through the tubing 44 a substantial distance from the intake. A set of mirrors is arranged to direct infrared energy through the multiple internal reflection crystal and thence to a spectrophotometer. Each temperature control means 24 is a peltier unit for heating or cooling backed by metal conduit 46 connected to tubings 48 shown only in part in FIG. 5 for circulating water to raise or lower the temperature of the crystal.

In its simplest form this invention may be used for monitoring for organophosphorus compounds by passing the infrared energy from the source through a very narrow band filter that transmits infrared of approximately 9.6 micron wavelength, which interacts with organophosphorus compounds. The energy that passes through the crystal is continuously monitored photoelectrically for rapid attenuation at the output from the crystal for triggering an alarm circuit. The response time of this arrangement is short, less than a minute, to the presence of dangerously high concentration of toxic organophosphorus substances in the atmosphere. The temperature of the crystal is reduced from ambient to about 15°C. by the temperature control means 24 and 46 for efficient response to the presence of contaminant. Monitoring is continuous and requires no attention. A straightforward amplifier and relay in the amplifier circuit for coupling and decoupling the alarm and its power supply suffice for the purpose. The contaminant absorbed by the coated crystal is carried away gradually when the concentration of the toxic substance in the sampled atmosphere drops substantially but can be speeded by operating the temperature control means 24 and 46 to raise the temperature of the crystal substantially above ambient temperature. A contaminated cell is automatically decontaminated after a time by the continuous flow of sampled atmosphere when the sampled atmosphere no longer carries contaminant, whether or not the cell temperature is elevated. The cell is usable over and over. Instead of being used with an alarm, the invention may be used with a spectrophotometer wherein the infrared band is at least 9–10 microns to obtain a graphic plot of attenuation $v$ wavelength at selected time intervals or as a supplement to the alarm arrangement to identify the specific contaminant that triggered the alarm. The toxic organophosphorus substances have absorption characteristics which are as individual as fingerprints.

Figure 7:
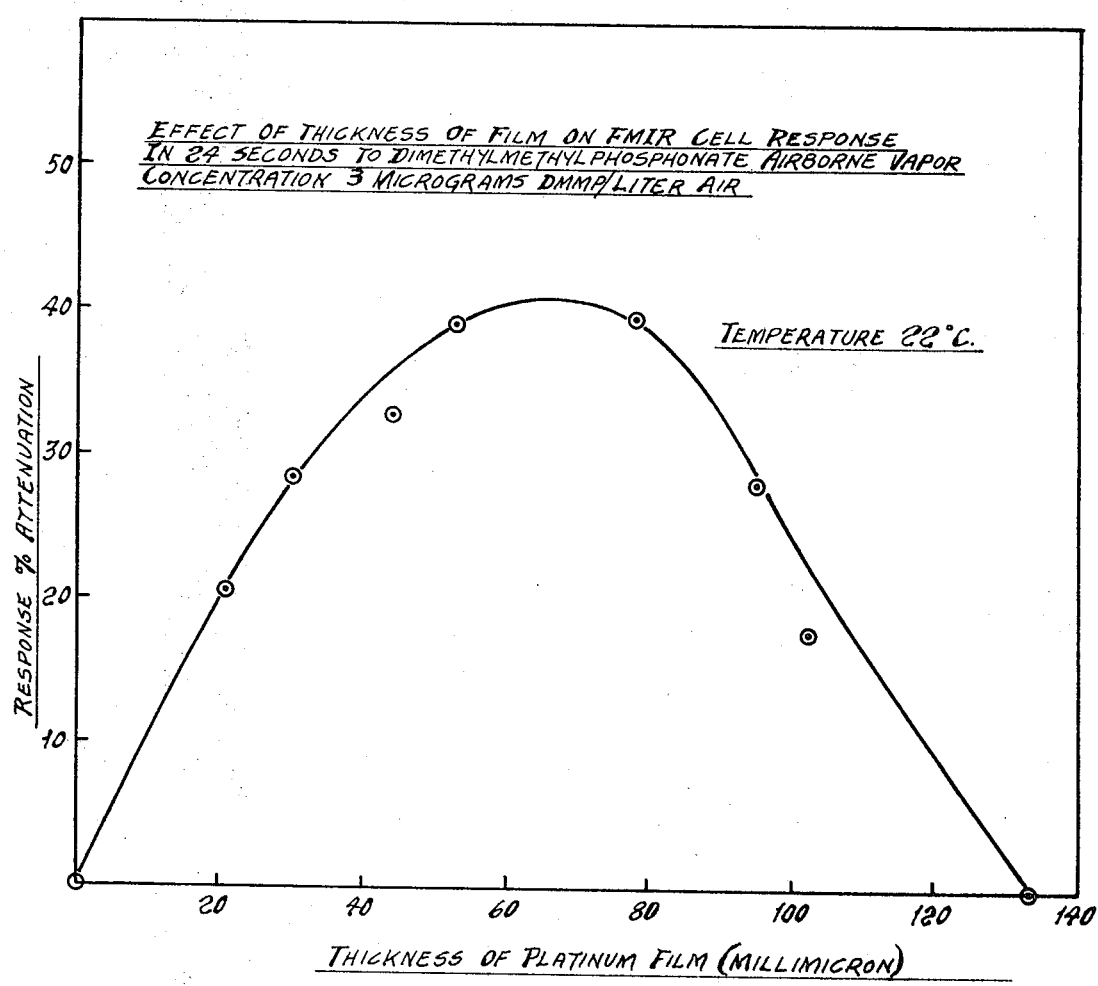
FIG. 7 is a graphical showing of the relationship of coating thickness and attenuation response.

Crystals of materials other than germanium for multiple internal reflection spectroscopy are known in the art and may be used in practicing this invention. However germanium crystal is advantageous for frustrated multiple internal reflection spectroscopy studies of air pollutants because the platinum coating can be wiped off the germanium easily and cleanly and the crystal can be recoated either to another thickness, or in a different degree of vacuum or with a different material or any combination of the three. Thickness of the coating is measured by X-ray fluorescence or by comparing stopping power against that of a reference standard. FIG. 7 shows the effect of thickness of platinum film on cell response. Response for platinum is best at about 70 millimicrons. With lesser thickness, the film is less adsorptive. With increased thickness, less of internally reflected infrared energy penetrates to the absorbed substance and, in effect, does not see the absorbed substance as well.

While other noble metals can be coated on the crystal to obtain the type of effect described, platinum was found to be superior for the purpose. The crystal base and the opposite parallel surface are coated with the platinum in not too high a vacuum, i.e. 10 millimicrons of mercury in order that the coating have a degree of surface porosity for good absorptiveness. An optimum mirror finish obtained by coating in optimum vacuum has poor absorptiveness.

While the crystal shown is in the shape of a parallelogram, in cross section, the crystal may just as well be in the shape of an isosceles trapezoid in cross section; the mirror optics is modified accordingly. Though a 45° angle between the sloping sides and the base provides good results in using platinum coated germanium, the only limitation on the size of this angle is that it differ from 90° sufficiently for the angle of incidence to the base or parallel surface exceed the critical angle.

Obviously many modifications and variations of the present invention are possible in the light of the above teachings. It is therefore to be understood that within the scope of the appended claims the invention may be practiced otherwise than as specifically described.

We claim:

1. A method of using a thin germanium crystal prism having a pair of opposed parallel surfaces spaced by the thinness dimension and further having a pair of opposed slant sides at angles suitable for multiple internal reflection, for monitoring the atmosphere for a particular contaminant, said method comprising the steps of coating the opposed surfaces of the prism with platinum by vacuum deposition in a vacuum on the order of 10 millimicrons of mercury to a coating thickness of about 70 millimicrons, confining a small air-space volume against a selected portion of each of the opposed platinum-coated surfaces, continuously sampling the atmosphere and flowing the sampling through both confined air-space volumes and across the platinum coated surface portions bordering the volumes, directing infrared energy of predetermined bandwidth normal to a slant side of the prism for multiple internal reflection therein, and monitoring the infrared energy existing from the other slant side of the prism for attenuation that characterizes the contaminant.